US008163387B2

(12) United States Patent
Kurihara et al.

(10) Patent No.: US 8,163,387 B2
(45) Date of Patent: Apr. 24, 2012

(54) ORGANIC FRICTION MODIFIER COMPRISING LAMINAR GRAPHITE AND ARAMID RESIN

(75) Inventors: Shou Kurihara, Tokyo (JP); Hiroshi Idei, Tokyo (JP); Yoshihiro Aoyagi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 52 days.

(21) Appl. No.: 12/149,109

(22) Filed: Apr. 25, 2008

(65) Prior Publication Data

US 2008/0268247 A1 Oct. 30, 2008

(30) Foreign Application Priority Data

Apr. 27, 2007 (JP) .............................. P.2007-118806

(51) Int. Cl.
B32B 5/16 (2006.01)
(52) U.S. Cl. ........................................ 428/403; 428/407
(58) Field of Classification Search .................. 428/403, 428/407
See application file for complete search history.

(56) References Cited

U.S. PATENT DOCUMENTS

| 4,256,801 | A |   | 3/1981  | Chuluda                      |
|-----------|---|---|---------|------------------------------|
| 4,642,201 | A | * | 2/1987  | Vogel ..................... 252/503 |
| 4,785,029 | A | * | 11/1988 | Honma et al. ............. 523/153 |
| 4,876,077 | A | * | 10/1989 | Murakami ................. 423/448 |
| 5,085,700 | A | * | 2/1992  | Howard ..................... 106/33 |
| 5,087,642 | A | * | 2/1992  | Seki et al. ................ 523/156 |
| 5,298,028 | A | * | 3/1994  | Hsu .......................... 8/130.1 |
| 5,460,881 | A | * | 10/1995 | Hsu .......................... 428/357 |
| 5,622,785 | A | * | 4/1997  | Gaylor et al. .............. 428/525 |
| 5,753,356 | A |   | 5/1998  | Lam et al.                   |
| 5,776,839 | A | * | 7/1998  | Dischler et al. ............ 442/239 |
| 5,811,042 | A | * | 9/1998  | Hoiness ................... 264/122 |
| 5,817,411 | A | * | 10/1998 | Nakajima ................ 428/334 |
| 6,316,083 | B1|   | 11/2001 | Kawabata et al.             |
| 6,316,534 | B1| * | 11/2001 | Shimokusuzono et al. .. 524/284 |
| 6,500,893 | B2| * | 12/2002 | Yamada et al. ............. 524/495 |
| 7,252,795 | B2| * | 8/2007  | Ozaki et al. ............. 264/29.7 |
| 7,455,750 | B2| * | 11/2008 | Conley et al. ............. 162/157.3 |
| 2003/0045606 | A1 | * | 3/2003 | Kusaka et al. ........... 523/149 |
| 2009/0090640 | A1 |   | 4/2009 | Jang et al.                 |

FOREIGN PATENT DOCUMENTS

| CN | 1431406    | A  | 7/2003  |
| CN | 1900162    | A  | 1/2007  |
| DE | 10393067   | T5 | 9/2005  |
| EP | 0302987    | A1 | 2/1989  |
| EP | 0425910    | A1 | 10/1990 |
| EP | 0766019    | A1 | 4/1997  |
| JP | 55 92780   |    | 7/1980  |
| JP | 55-092780  |    | 7/1980  |
| JP | 60-129438  |    | 7/1985  |
| JP | 03-181532  |    | 8/1991  |
| JP | 06171007   | A  | 6/1994  |
| JP | 7-11238    |    | 1/1995  |
| JP | 2001-316659|    | 11/2001 |
| JP | 2002-294218|    | 10/2002 |
| JP | 2005-29653 |    | 2/2005  |
| JP | 2006-233017|    | 9/2006  |

OTHER PUBLICATIONS

Uhl et al., Expandable graphite/polyamide-6 nanocomposites, Polymer Degradation and Stability 89 (2005) 70-84.*
Tiodize brochure, TRIBO/COMP Self-Lubricating Composites (accessed online Aug. 17, 2010).*
European Search Report in EP Application No. EP 08 00 7949, dated Aug. 12, 2008.
English-language Translation of Notice of Opposition dated Oct. 18, 2010, for European Application No. EP 1985885B1.
Kevlar® Aramid Fiber Technical Guide, DuPont Advanced Fibers Systems, H-77848 4/00 (32 pages), (2011).
Abstract of DE 10393067 (T5) (Kaschak, et al.).
Abstract of EP 0302987 (A1) (Gabriele, et al.)
Abstract of JP 55092780A (Hitachi Chemical Co. Ltd.).
English Language Translation of CN 1900162A (Zhang Ming Li).
English Language Translation of CN 1431406A (Xuemin, et al.).
English Language Translation of JP 03-181532 (Yoshida Shoten KK).
English Language Translation of JP 06171007 A (Toyo Tanso KK).
English Language Translation of JP 2001-316659 (Toyota Motor Corp.).
English Language Translation of JP 2006-233017 (Toray Ind. Inc.).
Notice of Opposition dated Oct. 18, 2010, for European Application No. EP 1985885B1.
Opposition against European Patent No. 1985885, filed in the European Patent Office by Akebono Brake Industry Co., Ltd. in response to the Summons to Attend Oral Proceedings dated Dec. 16, 2011 (7 pages).
English-language translation of Opposition against European Patent No. 1985885, filed in the European Patent Office by Akebono Brake Industry Co., Ltd. in response to the Summons to Attend Oral Proceedings dated Dec. 16, 2011 (5 pages).
Rompp Chemie Lexikon, $9^{15}$ Edition, 1990; keyword "graphite" (4 pages).
Yen, B. et al, Origin of low-friction behavior in graphite investigated by surface X-ray diffraction, May 2004 (13 pages).

* cited by examiner

*Primary Examiner* — Hoa (Holly) Le
(74) *Attorney, Agent, or Firm* — Finnegan, Henderson, Farabow, Garrett & Dunner, LLP

(57) ABSTRACT

An organic friction modifier is provided with a composite material particle in which laminar graphite particles are dispersed in an aramid resin. In addition, a friction material is provided with an organic friction modifier including a composite material particle in which laminar graphite particles are dispersed in an aramid resin.

6 Claims, No Drawings

ORGANIC FRICTION MODIFIER COMPRISING LAMINAR GRAPHITE AND ARAMID RESIN

This application claims foreign priority from Japanese Patent Application No. 2007-118806 filed on Apr. 27, 2007, the entire contents of which are hereby incorporated by reference.

BACKGROUND OF THE INVENTION

1. Field of the Invention

The present invention relates to a friction material to be used for an industrial machine, a railway vehicle, a cargo vehicle or an automobile and, more particularly, to an organic friction modifier to be blended into the friction material.

2. Background Art

A friction material to be used in a brake such as a disc brake or a drum brake or in a clutch is made of a friction modifier for giving a friction action and for modifying the friction performance of the friction material, a fibrous reinforcement for a reinforcing action, and a binder for binding them thereby to give a strength.

Of these, as an ingredient for adjusting friction characteristics of the friction material is exemplified by the friction modifier and a solid lubricant. These ingredients are divided into inorganic and organic ones, which have individual features so that only one kind finds it difficult to satisfy all requirements. Therefore, two or more kind of ingredients are usually used in combination. As the friction modifier, there can be enumerated an inorganic friction modifier such as alumina, silica, magnesia, zirconia, copper, aluminum or zinc, or an organic friction modifier such as rubber powder or resin powder. As the solid lubricant, there can be enumerated graphite or molybdenum disulfide. Here in the friction material of the prior art for a brake apparatus, cashew dust or the like is used as the organic friction modifier (see Patent Documents 1 and 2). The organic friction modifier such as the cashew dust is liquidified on a friction surface at a mating member temperature of about 200 to 250° C. so that it performs a lubricating action and contributes to the prevention of a wear of a mating member, the stabilization of a friction coefficient, a noise prevention or the like.

Moreover, Patent Document 3 discloses a technique for improving wear characteristics at a high temperature by using an aramid resin powder as the organic friction modifier.

| | |
|---|---|
| [Patent Document 1] | JP-A-07-11238 |
| [Patent Document 2] | JP-A-2005-29653 |
| [Patent Document 3] | JP-A-2002-294218 |

However, the cashew dust is so low in a thermal-decomposition starting temperature as to cause a reduction of a friction coefficient and an increase of the wear due to a fading phenomenon at a temperature of 300° C. or higher. Moreover, any of the organic friction modifiers made of the cashew dust or the aramid resin powder, as enumerated above, has a high static friction coefficient so that it has problems to cause easily a stick slip phenomenon and a brake noise.

SUMMARY OF THE INVENTION

One or more embodiments of the present invention provide an organic friction modifier which is excellent in a fade suppression and a high-temperature friction, which has a friction coefficient stabilized to a low temperature range, which has a brake noise suppressed, and which can give a high strength, a high thermal conductivity and a high attenuation factor to a friction material.

Moreover, one or more embodiments of the invention provide a friction material which is enabled to have the aforementioned excellent performances by containing an organic friction modifier having the aforementioned characteristics.

In accordance with one or more embodiments of the present invention, an organic friction modifier is provided with a composite material particle in which laminar graphite particles are dispersed in an aramid resin.

In the organic friction modifier, the aramid resin may comprise a poly-paraphenylene terephthalamide.

In the organic friction modifier, the blending ratio of the graphite particles to the aramid resin may be 5 to 50 mass %.

In the organic friction modifier, an average particle diameter of the organic friction modifier is 50 to 500 μm.

Moreover, in accordance with one or more embodiments of the present invention, a friction material may provided with an organic friction modifier including a composite material particle in which laminar graphite particles are dispersed in an aramid resin.

The organic friction modifier of the one or more embodiments of the present invention has a high air thermal-decomposition temperature in the aramid resin. For example, the poly-paraphenylene terephthalamide (PPTA) has the thermal-decomposition temperature of 550° C., and the graphite to be dispersed into the PPTA has the same temperature of 600° C. As a result, the organic friction modifier is effective for the fade suppression and the high-temperature wear improvement so that the friction coefficient is stabilized from a low-temperature range to a high-temperature range.

By the lubricating effect of the graphite dispersed in the PPTA, moreover, the static friction coefficient is reduced to suppress the brake noise.

Moreover, the effects such as the high strength, the high thermal conductivity and the high attenuation factor can be expected from the graphite thinned and dispersed in the PPTA.

Other aspects and advantages of the invention will be apparent from the following description, examples, and the claims.

DETAILED DESCRIPTION OF THE EXEMPLARY EMBODIMENTS

An exemplary embodiment of the present invention are described in detail in the following.

As an aramid resin, in the exemplary embodiment, there can be used a variety of kinds, of which poly-paraphenylene terephthalamide (PPTA) is preferably used, for example. A preferred specific example is exemplified by an organic friction modifier characterized by a mode, in which graphite particles are laminated and dispersed in the PPTA.

The graphite is easily laminated from its structure. It is, however, necessary for obtaining laminar graphite particles to treat the graphite. The easiest method is to treat the graphite with sulfuric acid, but another method is also known. A composite of sulfuric acid between graphite layers (i.e., a graphite intercalation composite=GIC) is produced in case graphite is treated with sulfuric acid.

The aforementioned graphite intercalation composite (GIC) is synthesized by dipping graphite in sulfuric acid and by adding an oxidizing agent, thereby to have a structure, in which sulfuric acid molecules are inserted between graphite layers. The distance between the graphite layers is enlarged to make it easy to insert the PPTA molecules between the graphite layers. The aforementioned GIC can also be manufactured by another method.

Moreover, the aforementioned organic friction modifier is synthesized by mixing the sulfuric acid solution of the PPTA and the sulfuric acid solution of the graphite intercalation composite (GIC), by dripping to neutralize the mixed liquid in water or an alkali solution, and by drying the mixture, after solidified. The PPTA is soluble in sulfuric acid so that its sulfuric acid solution can be well mixed with the sulfuric acid solution or slurry of the GIC.

It is known that the aramid resin has three types of para, meta-para and meta types.

<Para-Type Aramid Resin>

Kevlar representing the PPTA fiber produced from para-type aramid resin (PPTA) is manufactured by Du Pont Company, and Twaron is an aramid of the same kind and structure as those of Kevlar, and is manufactured by Twaron Products Company.

<Meta-Para Type Aramid Resin>

Technora is a copolymer which is improved in solubility by co-polymerizing the main chain of Kevlar with a third component, and in which about 50 molar % of the diamine component is 3,4-diaminodiphenylether. Technora is of a copolymer type so that the thermal properties do not extend to the PPTA resin of a homo polymer.

<Meta-Type Aramid Resin>

The meta-type aramid resin having a constitution unit of a meta-phenylene group has a bent molecular structure so that it is inferior in strength and modulus of elasticity to the para-type aramid resin but is superior in fire resistance, heat resistance, weather resistance, chemical resistance and soon. Nomex or one of commercially available fibers of meta-type aramid resins is a representative one of the meta-type aramid fibers developed by Du Pont in 1960. Main raw ingredients are meta-phenylene diamine and isophthalic chloride. On the other hand, Conex is manufactured by Teijin Limited and composed mainly of meta-phenylene diamine and isophthalic chloride, and its polymer is manufactured by dehydrochlorination and condensation-polymerization and used in place of asbestos or as fiber-reinforced plastics (FRP).

The aramid resin powder to be used may have an average particle diameter of 10 to 2,000 μm, preferably 30 to 500 μm.

Moreover, it is preferred that the blending ratio of graphite particles to the aforementioned aramid resin in the composite material particles, in which the blending ratio of the graphite particles to the aforementioned aramid resin is 5 to 50 mass %. Here, if the bending ratio of the graphite particles is less than 5 mass %, a stick slip phenomenon easily occurs to cause a defect that it easily becomes a cause for a brake noise. If the ratio exceeds 50 mass %, on the other hand, the average friction coefficient becomes so small as to cause a defect that the brake becomes ineffective.

The organic friction modifier of the exemplary embodiment is prepared, as has been described hereinbefore, by mixing the sulfuric acid solution of the PPTA and the sulfuric acid solution of the GIC, by dipping to neutralize the mixture liquid in the water or the alkaline solution, and by heating and drying to harden the mixture liquid, after solidified. The hardened material acquired finally is pulverized into the organic friction modifier. The particle diameter of the organic friction modifier pulverized is not especially limitative, but can be suitably determined according to the characteristics demanded for the friction material. In order to avoid the deterioration of the dispersion at the time of mixing the ingredients, however, it is desired that the particle diameter is 50 to 500 μm, and it is more desired that the average diameter is made uniform at about 140 to 260 μm.

Moreover, the invention relates to a friction material containing the aforementioned organic friction modifier.

Ordinary ingredients are employed when the friction material is blended. A reinforcing fibrous reinforcement is exemplified by heat-resisting organic fibers, inorganic fibers and metal fibers. The heat-resisting organic fibers are exemplified by aromatic polyamide fibers or fire-resisting acrylic fibers; the inorganic fibers are exemplified by ceramic fibers such as fibers of potassium titanate or alumina fibers, glass fibers, carbon fibers or rock wool; and the metal fibers are exemplified by copper fibers or steel fibers. The inorganic filler is exemplified by particles of barium nitrate or calcium carbonate.

A binder is exemplified by a phenol resin (including a straight phenol resin or various kinds of phenol resins modified with rubber etc.), a melamine resin or an epoxy resin. On the other hand, the friction modifier is exemplified by an inorganic friction modifier such as alumina, silica, magnesia, zirconia, copper, aluminum or zinc, or an organic friction modifier such as rubber powder or resin powder. The solid lubricant is exemplified by graphite or molybdenum disulfide.

It is preferred that the reinforcing fibrous reinforcement is contained in 15 to 40 mass % of the entirety of the friction material, that the friction modifier is contained in 10 to 25 mass %, that the filler is contained in 35 to 70 mass %, and that the binder is contained in 6 to 24 mass %.

In the friction material of the exemplary embodiment thus far described, it is preferred that the friction modifier is contained in 2 to 15 mass %.

The manufacture of the friction material can be performed by the well-known manufacturing process so that the friction material can be manufactured through the steps including preforming, thermoforming, heating and grinding steps and so on. In the case of a process for manufacturing a friction pad for a disc brake, both a pressure plate, which is formed by a sheet metal pressing into a predetermined shape, which is subjected to a degreasing treatment and a primer treatment and to which an adhesive is applied, and a preformed object, which is prepared by preforming such a raw materials at an ordinary temperature under a predetermined pressure as is prepared by blending a fibrous reinforcement such as heat-resisting organic fibers, inorganic fibers or metal fibers and a powder ingredient such as an inorganic/organic filler, a friction modifier and a binder and by agitating them sufficiently homogeneously, are secured integrally at a predetermined temperature and under a pressure at a thermoforming step, and are after-cured and finally finished. The friction material can be manufactured by those steps.

EXAMPLES

In the following, the exemplary embodiment of the invention is specifically described in connection with its examples. The invention should not be limited to those examples.

Examples 1 to 3 and Comparisons 1 to 4

Synthesization of Organic Friction Modifier (1) Natural flake graphite, concentrated sulfuric acid, and concentrated nitric acid as an oxidizing agent were introduced into a beaker and agitated at an ordinary temperature for 24 hours to prepare the slurry of a graphite intercalation composite.

(2) The PPTA (or Kevlar under the trade name) and concentrated sulfuric acid were introduced into and agitated in a beaker, and were agitated for 30 minutes by adding the slurry of the graphite intercalation composite, to acquire a mixed solution.

(3) 10 liters of distilled water was prepared in a stainless steel container, and a mixture solution of the aforementioned (2) was dipped into the distilled water being agitated, to recover complex particles of the PPTA of a diameter of about 2 mm and the graphite.

(4) The recovered particles were dried in an oven at 120° C. for 8 hours, and were pulverized/classified to acquire an organic friction modifier having an average particle diameter of 200 μm.

(5) The aforementioned operations were performed with the blending contents, as tabulated in Table 1, to synthesize five kinds of organic friction modifiers A to E having different composition percentages of the PPTA and the graphite.

TABLE 1

Components (in Mass Parts) of Organic Friction modifier

| | | A | B | C | D | E |
|---|---|---|---|---|---|---|
| Slurry of Sulfuric Acid-GIC | Graphite | 1 | 5 | 20 | 50 | 70 |
| | Concentrated Sulfuric Acid | 17.5 | 87.5 | 350 | 875 | 1225 |
| | Concentrated Nitric Acid | 1 | 5 | 20 | 50 | 70 |
| PPTA Solution | PPTA | 100 | 100 | 100 | 100 | 100 |
| | Concentrated Sulfuric Acid | 1000 | 1000 | 1000 | 1000 | 1000 |
| Composition Percentage (%) of Graphite/PPTA | | 1 | 5 | 20 | 50 | 70 |

(Manufacture of Friction Material]

The friction materials of Examples 1 to 3 and Comparisons 1 to 4 were manufactured according to the blending tabulated in Table 2.

The blends tabulated in Table 2 were mixed by a mixer, and the mixture was introduced into a preforming mold and was compressed and preformed at an ordinary temperature under a pressure of 30 MPa. Next, the preparatory forming and a pressure plate having an adhesive applied in advance thereto were set in a thermoforming mold and were subjected to a heated compression forming at 150° C. under 40 MPa. The thermoformed article obtained was subjected to a heat treatment at 220° C. for 3 hours to acquire a friction material.

TABLE 2

Components (in Mass Parts) of Friction Material

| Identification Raw Material | Ex. 1 | Ex. 2 | Ex. 3 | Comp. 1 | Comp. 2 | Comp. 3 | Comp. 4 |
|---|---|---|---|---|---|---|---|
| Phenol Resin | 19 | 19 | 19 | 19 | 19 | 19 | 19 |
| Aramid Pulp | 13 | 13 | 13 | 13 | 13 | 13 | 13 |
| Inorganic Fibers | 19 | 19 | 19 | 19 | 19 | 19 | 19 |
| Zirconium Silicate | 4 | 4 | 4 | 4 | 4 | 4 | 4 |
| Barium Sulfate | 36 | 36 | 36 | 36 | 36 | 36 | 36 |
| A | — | — | — | 9 | — | — | — |
| B | 9 | — | — | — | — | — | — |
| C | — | 9 | — | — | — | — | — |
| D | — | — | 9 | — | — | — | — |
| E | — | — | — | — | 9 | — | — |
| Aramid (PPTA) Powder | — | — | — | — | — | 9 | — |
| Cashew Dust | — | — | — | — | — | — | 9 |
| Total | 100 | 100 | 100 | 100 | 100 | 100 | 100 |

A: Organic Friction modifier A
B: Organic Friction modifier B
C: Organic Friction modifier C
D: Organic Friction modifier D
E: Organic Friction modifier E

[Evaluations of Friction Material]

The friction materials acquired in Examples 1 to 3 and Comparisons 1 to 4 were evaluated on the following items.

1) Friction Tests by Temperature

Test pieces were cut out from the friction materials acquired in Examples 1 to 3 and Comparisons 1 to 4, and were tested under the following conditions by means of a test piece friction tester, thereby to compare average friction coefficients and wear rates.

Mating Member: FC250

Friction Temperatures (Mating Member Temperatures):
100° C., 200° C., 300° C., 400° C.

Friction Number: 500

Initial Speed: 15 m/sec.

Deceleration: 2.94 m/sec.2

2) Fade Tests

Test pieces were cut out from the friction materials acquired in Examples 1 to 3 and Comparisons 1 to 4, and were tested by a test piece friction tester in accordance with JPSO-C406-82, thereby to compare the minimum friction coefficients of a first fade.

3) The friction materials of the friction materials acquired in Examples 1 to 3 and Comparisons 1 to 4 were mounted on a real car and were adjusted according to JASO-C406. The tests were conducted in a test code combining a vehicle speed: 5 to 60 Km/h, a deceleration: 0.49 to 7.84 m/sec2, a friction temperature: 20° C. to 200° C., and an absolute humidity: 5 to 15 g/m3, thereby to compare the presences/absences of the occurrence of the brake noise.

(Test Results)

These test results are tabulated in Table 3.

TABLE 3

Performance Evaluation Results

|  |  |  | Ex. 1 | Ex. 2 | Ex. 3 | Comp. 1 | Comp. 2 | Comp. 3 | Comp. 4 |
|---|---|---|---|---|---|---|---|---|---|
| Composition Percentage (%) of Graphite/PPTA | | | 5 | 20 | 50 | 1 | 70 | 0 | — |
| 1 | 2 | 100° C. | 0.35 | 0.34 | 0.33 | 0.35 | 0.24 | 0.35 | 0.35 |
|   |   | 200° C. | 0.35 | 0.33 | 0.33 | 0.36 | 0.26 | 0.36 | 0.35 |
|   |   | 300° C. | 0.34 | 0.32 | 0.31 | 0.34 | 0.23 | 0.36 | 0.31 |
|   |   | 400° C. | 0.33 | 0.33 | 0.31 | 0.32 | 0.24 | 0.33 | 0.28 |
|   | 3 | 100° C. | 0.38 | 0.33 | 0.30 | 0.40 | 0.27 | 0.41 | 0.41 |
|   |   | 200° C. | 0.16 | 0.15 | 0.13 | 0.17 | 0.12 | 0.16 | 0.17 |
|   |   | 300° C. | 0.36 | 0.34 | 0.32 | 0.37 | 0.30 | 0.38 | 0.72 |
|   |   | 400° C. | 1.30 | 1.27 | 1.24 | 1.32 | 1.22 | 1.34 | 1.75 |
| Minimum Friction Coefficient in Fade Tests | | | 0.24 | 0.23 | 0.20 | 0.24 | 0.20 | 0.24 | 0.18 |
| Presence/Absence of Brake Noise | | | NO | NO | NO | YES | NO | YES | YES |

Ex. Example
Comp. Comparison
1: Friction Tests by Temperature
2: Average Friction Coefficient
3: Friction Coefficient (×10−41 mm3/N · m)

From the results of Table 3, it has been confirmed that the friction materials acquired in Examples 1 to 3 and Comparisons 1 to 4 had few changes of the friction coefficients due to the friction temperature, and were excellent in wear resistance. It has been recognized that neither reduction in the friction coefficient nor the brake noise was in the fade tests, and that the friction material performances were prominently improved.

The organic friction modifier of the invention has far higher thermal-decomposition starting temperatures of the constituent ingredients in the air than those of the cashew dust of the prior art. Therefore, the friction material containing that friction modifier is high in the fade suppression and the high-temperature wear improving effect, so that its friction coefficient is stabilized from a low temperature range to a high temperature range. Moreover, the static friction coefficient is reduced by the graphite dispersed in the PPTA so that the brake noise is suppressed. The improving effects such as a high strength, a high thermal conductivity and a high attenuation factor are improved so that the organic friction modifier manufactured by the invention is highly probably adopted in the process for manufacturing the friction material.

While description has been made in connection with specific embodiments and examples of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. An organic friction modifier comprising a composite material particle in which laminar graphite particles are dispersed within a poly-paraphenylene terephthalamide throughout a whole of the composite material particle.

2. The organic friction modifier according to claim 1, wherein the blending ratio of the graphite particles to the poly-paraphenylene terephthalamide is 5 to 10 mass %.

3. The organic friction modifier according to claim 1, wherein the average particle diameter of the organic friction modifier is 50 to 500 μm.

4. A friction material comprising an organic friction modifier including a composite material particle in which laminar graphite particles are dispersed within a poly-paraphenylene terephthalamide throughout a whole of the composite material particle.

5. An organic friction modifier comprising:
a resin consisting essentially of a poly-paraphenylene terephthalamide, and
laminar graphite particles uniformly dispersed throughout the poly-paraphenylene terephthalamide.

6. An organic friction modifier consisting essentially of:
a poly-paraphenylene terephthalamide, and
laminar graphite particles uniformly dispersed throughout the aramid resin poly-paraphenylene terephthalamide.

* * * * *

UNITED STATES PATENT AND TRADEMARK OFFICE
CERTIFICATE OF CORRECTION

| | | |
|---|---|---|
| PATENT NO. | : 8,163,387 B2 | Page 1 of 1 |
| APPLICATION NO. | : 12/149109 | |
| DATED | : April 24, 2012 | |
| INVENTOR(S) | : Shou Kurihara, Hiroshi Idei and Yoshihiro Aoyagi | |

It is certified that error appears in the above-identified patent and that said Letters Patent is hereby corrected as shown below:

Claim 6, col. 8, last line, delete "aramid resin".

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,163,387 B2 |
| APPLICATION NO. | : 12/149109 |
| DATED | : April 24, 2012 |
| INVENTOR(S) | : Shou Kurihara, Hiroshi Idei and Yoshihiro Aoyagi |

It is certified that error appears in the above-identified patent and that said Letters Patent is hereby corrected as shown below:

Column 8, line 55 (Claim 6, line 4) delete "aramid resin".

This certificate supersedes the Certificate of Correction issued August 14, 2012.

Signed and Sealed this
Fourth Day of September, 2012

David J. Kappos
*Director of the United States Patent and Trademark Office*